(12) United States Patent
Jin et al.

(10) Patent No.: US 11,385,834 B2
(45) Date of Patent: Jul. 12, 2022

(54) DATA STORAGE DEVICE, STORAGE SYSTEM USING THE SAME, AND METHOD OF OPERATING THE SAME

(71) Applicant: SK hynix Inc., Icheon (KR)

(72) Inventors: Yong Jin, Icheon (KR); Jun Hee Ryu, Icheon (KR); Jong Chan Kim, Icheon (KR); Kyong Seon Lim, Icheon (KR)

(73) Assignee: SK hynix Inc., Icheon (KR)

( * ) Notice: Subject to any disclaimer, the term of this patent is extended or adjusted under 35 U.S.C. 154(b) by 56 days.

(21) Appl. No.: 16/897,017

(22) Filed: Jun. 9, 2020

(65) Prior Publication Data

US 2021/0141565 A1    May 13, 2021

(30) Foreign Application Priority Data

Nov. 11, 2019   (KR) .................. 10-2019-0143315

(51) Int. Cl.
    *G06F 3/06*     (2006.01)
    *G06F 13/40*    (2006.01)
    *G06F 13/42*    (2006.01)

(52) U.S. Cl.
    CPC .......... *G06F 3/0659* (2013.01); *G06F 3/0611* (2013.01); *G06F 3/0653* (2013.01); *G06F 3/0679* (2013.01); *G06F 13/4027* (2013.01); *G06F 13/4282* (2013.01); *G06F 2213/0026* (2013.01)

(58) Field of Classification Search
    CPC .... G06F 3/0611; G06F 3/0653; G06F 3/0659; G06F 3/0679; G06F 13/4027; G06F 13/4282; G06F 2213/0026
    See application file for complete search history.

(56) References Cited

U.S. PATENT DOCUMENTS

| | | | |
|---|---|---|---|
| 2012/0173827 A1* | 7/2012 | Wood | G11C 11/5642 711/154 |
| 2012/0317337 A1* | 12/2012 | Johar | G11C 16/349 711/103 |
| 2014/0129753 A1* | 5/2014 | Schuette | G06F 13/4068 710/301 |
| 2018/0267705 A1* | 9/2018 | Liu | G06F 3/0655 |
| 2019/0102083 A1* | 4/2019 | Dusija | G06F 3/0679 |
| 2019/0339867 A1* | 11/2019 | Allo | G06F 3/0658 |
| 2020/0401332 A1* | 12/2020 | Ravimohan | G06F 3/0616 |
| 2021/0064249 A1* | 3/2021 | Mehta | G06F 3/0634 |
| 2021/0089385 A1* | 3/2021 | Basuta | G06F 11/0751 |

FOREIGN PATENT DOCUMENTS

| KR | 20130022604 A | 3/2013 |
|---|---|---|
| KR | 20140109689 A | 9/2014 |

* cited by examiner

*Primary Examiner* — Eric T Oberly

(57) ABSTRACT

A data storage device and a storage system including the same are disclosed. The data storage device includes a nonvolatile memory device configured to store user data and metadata including data type identification information matched with the user data, and a controller to control the nonvolatile memory device to be switched to a cold data storage device for storing cold data only when a number of program-erase (PE) cycles of the nonvolatile memory device is equal to or larger than a reference value.

18 Claims, 12 Drawing Sheets

DATA STORAGE DEVICE, STORAGE SYSTEM USING THE SAME, AND METHOD OF OPERATING THE SAME

CROSS-REFERENCE TO RELATED APPLICATION

The present application claims priority under 35 U.S.C. § 119(a) to Korean Patent Application Number 10-2019-0143315, filed on Nov. 11, 2019, which is incorporated herein by reference in its entirety.

BACKGROUND

1. Technical Field

Various embodiments generally relate to a semiconductor device, and more particularly, to a data storage device and a storage system using the same.

2. Related Art

An All-flash array (AFA) is storage infrastructure including only flash memory drives other than mechanical disc drives. The AFA may be defined as a network-based storage system and called a solid-state array (SSA).

Such AFA solutions may constitute a storage pool usable in cloud/virtual machine environments and provide high availability, high performance, and various interfaces. The AFA Architecture may be dominated by flash-based architecture and solid-state drive (SSD)-based architecture.

An AFA SSD is a disk drive which ensures stable performance, and a lifespan of the AFA SSD has been managed based on drive writes per day (DWPD). However, as multi-cell storage performance of a NAND flash memory device is changed according to a memory mode, for example, a single-level cell (SLC) mode, a multi-level cell (MLC) mode, a triple-level cell (TLC) mode, or a quad-level cell (QLC) mode, the performance and lifespan of the AFA SSD are changed accordingly and therefore, there is a need for solutions for these issues.

SUMMARY

Embodiments are directed to a data storage device capable of improving lifespan and utilization ability of the data storage device in AFA environments, and a storage system using the same.

In an embodiment of the present disclosure, a data storage device may include: a nonvolatile memory device to store user data and metadata including data type identification information matched with the user data; and a controller to control the nonvolatile memory device to be switched to a cold data storage device for storing cold data only when a number of program-erase (PE) cycles of the nonvolatile memory device is equal to or larger than a reference value, wherein upon switching the nonvolatile memory device to the cold data storage device, the controller moves first type of data among the user data to an external data storage device and moves second type of data among the user data, stored in a first memory mode region of the nonvolatile memory device to a second memory mode region of the nonvolatile memory region, and wherein, according to a write request, the controller writes write data in one of the first and second memory mode regions according to a type of the write data.

In an embodiment of the present disclosure, a storage system may include: a host central processing unit (CPU) to determine, according to a number of program-erase (PE) cycles for each of a plurality of data storage devices, whether to use each of the plurality of data storage devices as a cold data storage device for storing cold data only; and the plurality of data storage devices communicating with the host CPU, each of the plurality of data storage devices changing a memory mode of a nonvolatile memory device included in each of the data storage devices according to the number of PE cycles of the nonvolatile memory device, determining a data storage position according to a data type of data stored in the nonvolatile memory device and a data type of write data upon changing the memory mode, and storing the data stored in the nonvolatile memory device and the write data in the determined data storage position.

In an embodiment of the present disclosure, a method of operating a storage system may include: a host CPU and a plurality of data storage devices, the method comprising: checking a number of PE cycles of each of the plurality of data storage device; determining whether the number of PE cycles is equal to or larger than a reference value; changing a data storage device having the number of PE cycles that is equal to or larger than the reference value to a cold data storage device storing cold data only; determining a data storage position according to a data type of data stored in a nonvolatile memory device of the data storage device and a data type of write data provided by the host CPU; and storing the data stored in the nonvolatile memory device and the write data in the determined data storage position.

According to an embodiment of the present disclosure, when the lifespan of a data storage device in AFA environments is equal to or smaller than a reference value, the corresponding data storage device is switched as a cold data storage device and thus the lifespan of the data storage device may be extended and performance of the data storage device may be improved.

According to an embodiment of the present disclosure, since a TLC mode of memory region or a SLC mode of memory region is switched as a memory region of a QLC mode, a storage space may be further ensured.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention are described in greater detail below with reference to the accompanying drawings. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment" or the like is not necessarily to only one embodiment, and different references to any such phrase are not necessarily to the same embodiment(s).

It will be understood that when an element or layer is referred to as being "on," "connected to" or "coupled with" another element or layer, it can be directly on, connected or coupled with the other element or layer or one or more intervening elements or layers may be present. It will be further understood that the terms "comprises" and/or "comprising," when used in this specification, do not preclude the existence or addition of other non-stated elements. Similarly, the indefinite articles "a" and "an" indicate one or more, unless stated or the context clearly indicates only one.

Figure 1:
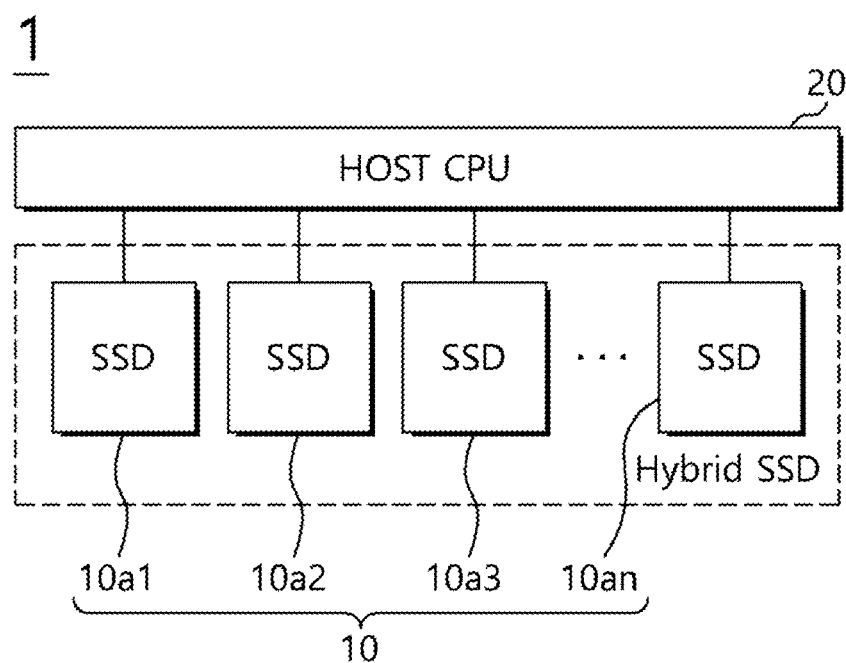
FIG. 1 is a diagram illustrating a storage system according to an embodiment of the present disclosure.
Figure 2:
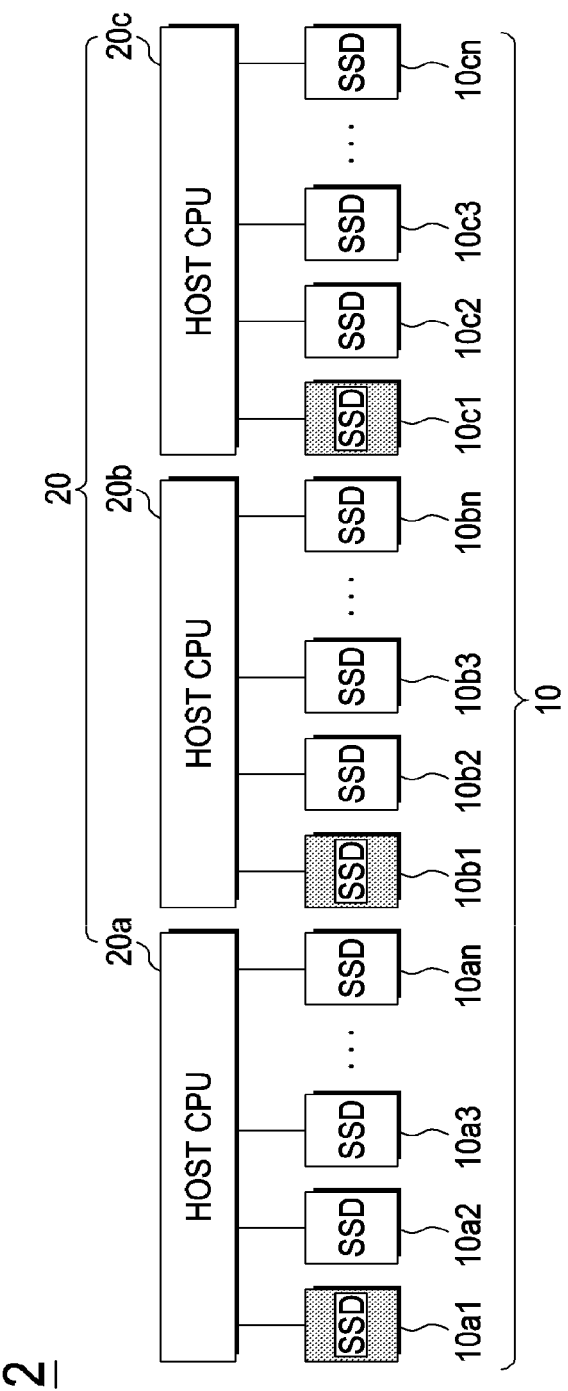
FIG. 2 is a diagram illustrating a storage system according to another embodiment of the present disclosure.

FIG. 1 is a diagram illustrating a storage system 1 according to an embodiment, and FIG. 2 is a diagram illustrating a storage system 2 according to another embodiment.

Figure 4:
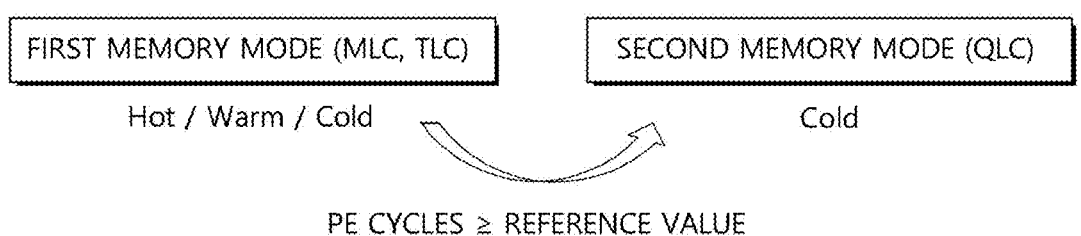
FIG. 4 is a diagram illustrating a switching method of a memory mode according to an embodiment of the present disclosure.
Figure 5:
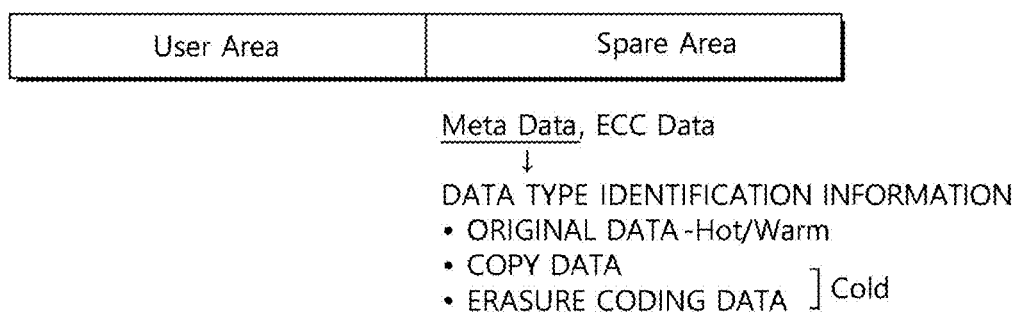
FIG. 5 is a diagram illustrating a data storage according to an embodiment of the present disclosure.
Figure 6:
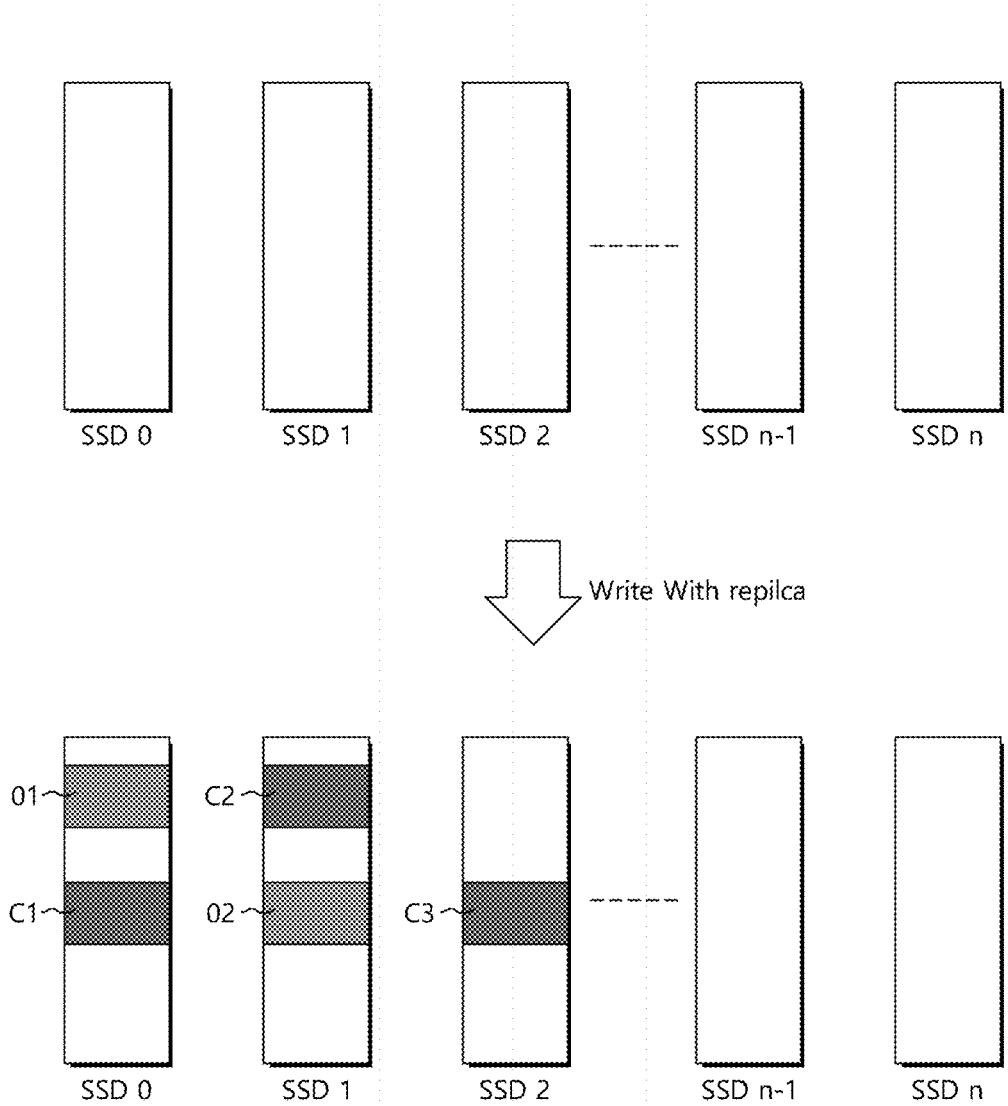
FIGS. 6 and 7 are diagrams illustrating cold data storages according to an embodiment of the present disclosure.
Figure 7:
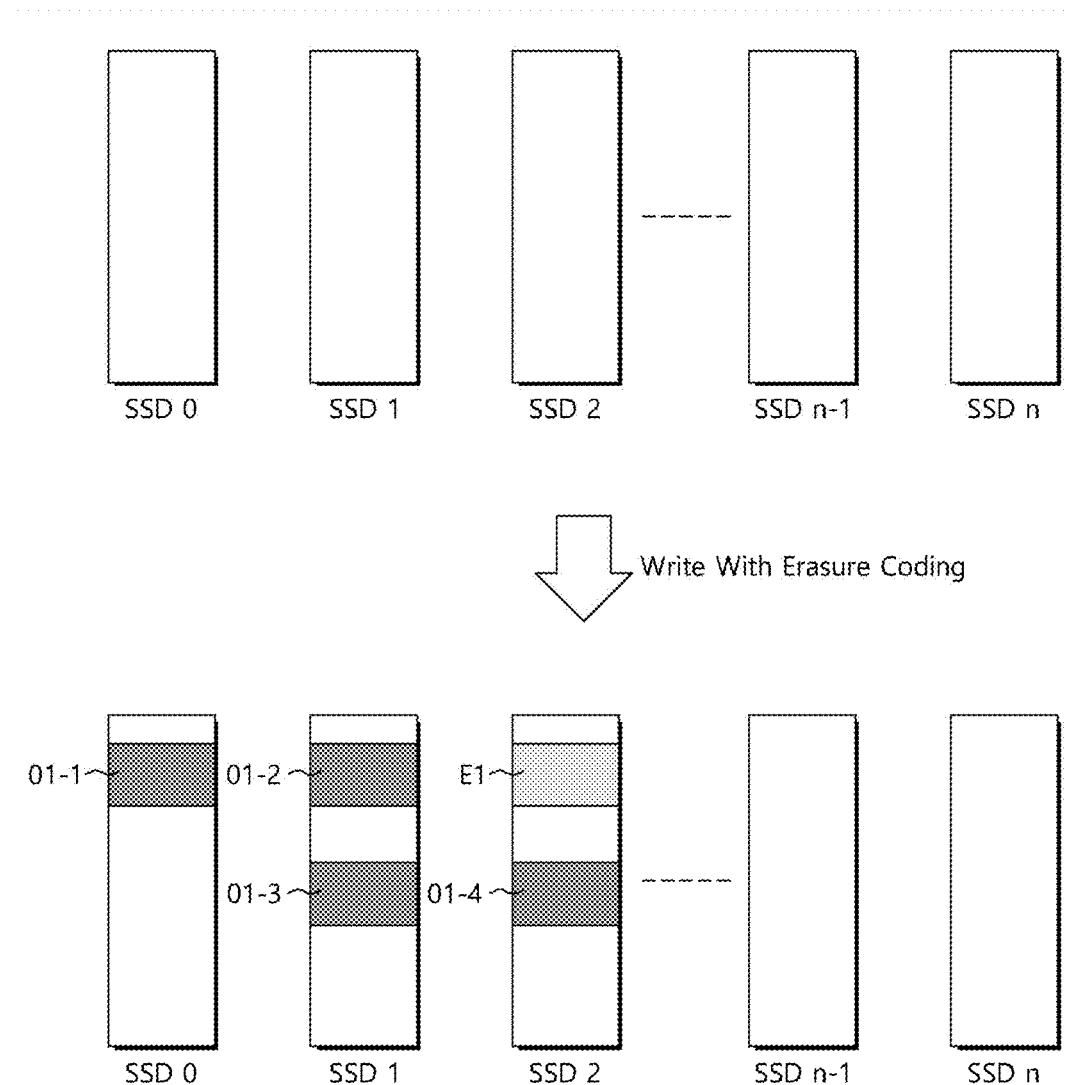

FIG. 4 is a diagram explaining a switching method of a memory mode of a host CPU according to an embodiment, FIG. 5 is a diagram illustrating a data storage example according to an embodiment, and FIGS. 6 and 7 are diagrams explaining cold data storage examples according to an embodiment. Hereinafter, a data storage system including a data storage device thereof will be described with reference to FIGS. 4 to 7.

Referring to FIG. 1, the storage system 1 may include a data storage device 10 and a host central processing unit (CPU) 20 coupled to the data storage device 10. The data storage device 10 may include a plurality of data storage devices 10a1 to 10an, n being a positive integer. For illustrative convenience, the data storage device 10 may represent any one of the plurality of data storage devices 10a1 to 10an hereinafter.

Referring to FIG. 2, the storage system 2 may be implemented with a host CPU 20 and a data storage device 10. The host CPU 20 may include a plurality of host CPUs, and the data storage device 10 may include a plurality of data storage devices. For illustrative convenience, the data storage device 10 may represent any one of the plurality of data storage devices hereinafter. The host CPU 20 and the data storage device 10 may constitute a plurality of sets. Each of the plurality of sets includes a corresponding host CPU and a plurality of data storage devices coupled to the corresponding host CPU. For example, as illustrated in FIG. 2, the storage system 2 may include three sets: a first set including a host CPU 20a and a plurality of data storage devices 10a1 to 10an corresponding to the host CPU 20a; a second set including a host CPU 20b and a plurality of data storage devices 10b1 to 10bn corresponding to the host CPU 20b; and a third set including a host CPU 20c and a plurality of data storage devices 10c1 to 10cn corresponding to the host CPU 20c.

The storage systems 1 and 2 each may refer to a storage system operating in AFA environments and may be implemented as shown in FIGS. 1 and 2, but embodiments are not limited thereto.

Referring to FIG. 1, the host CPU 20 may perform communication with the plurality of data storage devices 10a1 to 10an coupled thereto and may simultaneously transmit information including various control commands to the plurality of data storage devices 10a1 to 10an and receive information transmitted from the plurality of data storage devices 10a1 to 10an.

In an embodiment, the host CPU 20 may be implemented to perform an operation of monitoring the number of program-erase (PE) cycles of each of the plurality of data storage devices 10a1 to 10an and changing a memory mode or moving data stored in a specific data storage device to another data storage device among the plurality of data storage devices 10a1 to 10an based on the number of PE cycles. Accordingly, the data storage devices 10a1 to 10an may transfer lifespan information such as the number of PE cycles thereof to the host CPU 20. For example, when the specific data storage device is the data storage device 10a1, the other data storage device may be one of the data storage devices 10a2 to 10an.

In FIG. 2, the plurality of data storage devices 10a1 to 10an, 10b1 to 10bn, and 10c1 to 10cn may transfer lifespan information such as PE cycles thereof to the host CPUs 20a, 20b, and 20c, respectively. For example, when the specific data storage device is the data storage device 10a1, the other data storage device may be one of the data storage devices 10a2 to 10an, 10b1 to 10bn, and 10c1 to 10cn.

Referring back to FIG. 1, the host CPU 20 may determine whether to use each of the plurality of data storage devices 10a1 to 10an as a data storage device for cold data storage (hereinafter, referred to as a cold data storage device) according to the number of PE cycles of each of the plurality of data storage devices 10a1 to 10an.

For example, the host CPU 20 may transmit a switching command for switching a data storage device, of which the number of PE cycles is equal to or larger than a reference value, among the plurality of data storage devices 10a1 to 10an to the cold data storage device for storing cold data only. That is, when the number of PE cycles of a data storage device is equal to or larger than the reference value, the data storage device is used as the cold data storage device.

When sending a write request to each of the plurality of data storage devices 10a1 to 10an, the host CPU 20 may transmit data type identification information along with write data to each of the plurality of data storage devices 10a1 to 10an. The data type identification information may include information for identifying at least one of original data, copy data, and erasure coding data. Each of the data storage devices 10a1 to 10an may store the data type identification information received from the host CPU 20 and use the data type identification information to classify the write data into hot data warm data and cold data. For example, the original data may be referred to as the hot data or the warm data, and the copy data and the erasure coding data may be referred to as the cold data. Detailed description therefor will be provided later.

The plurality of data storage devices 10a1 to 10an may change the memory mode thereof according to the number of PE cycles of a nonvolatile memory device (see 100 of FIG. 3) included in each of the plurality of data storage devices 10a1 to 10an, determine a data storage position according to a data type of data stored in the nonvolatile memory device 100 and a data type of the write data, and store the data stored in the nonvolatile memory device 100 and the write data in the determined data storage position. Each of the plurality of data storage devices 10a1 to 10an may be a solid-state drive (SSD).

When a data movement command is provided by the host CPU 20, each of the plurality of data storage devices 10a1 to 10an may check the data type identification information for data, and then, based on the checked data type identification information may move second type of data among user data stored in the nonvolatile memory 100 to a second memory mode region of the nonvolatile memory 100 or another data storage device. The data type identification information may include information for identifying at least one of original data, copy data, and erasure coding data. The second type of data may be the cold data. For example, based on the data type identification information, the second type of data may be moved from the data storage device 10a to one of the data storage devices 10a2 to 10an in FIG. 1 or to one of the data storage devices 10a2 to 10an, 10b1 to 10bn, and 10c1 to 10cn in FIG. 2 in response to the data movement command. In another example, based on the data type identification information, the second type of data may be moved between memory mode regions within the nonvolatile memory device 100, in which the second type of data is currently stored, in response to the data movement command.

When the nonvolatile memory 100 includes a first memory mode region and the second memory mode region, the first memory mode region may be an N-bit NAND cell region and the second memory mode region may be an (N+1)-bit NAND cell region. For example, when the first memory mode region is a multi-level cell (MLC) mode memory region or a triple-level cell (TLC) mode memory region, the second memory mode region may be a quad-level cell (QLC) mode memory region. Detailed description therefor will be provided later.

Each of the plurality of data storage devices 10a1 to 10an may transmit a lifespan indicator including its PE cycle information to the host CPU 20.

Each of the plurality of data storage devices 10a1 to 10an may support PCI Express peer to peer (PCIe P2P) communication. The plurality of data storage devices 10a1 to 10an may move data stored in their nonvolatile memory devices 100 therebetween using the PCIe P2P communication.

The above described operations of the host CPU 20 and the plurality of data storage devices 10a1 to 10an may be applied to each of the plurality of sets shown in FIG. 2.

Figure 3:
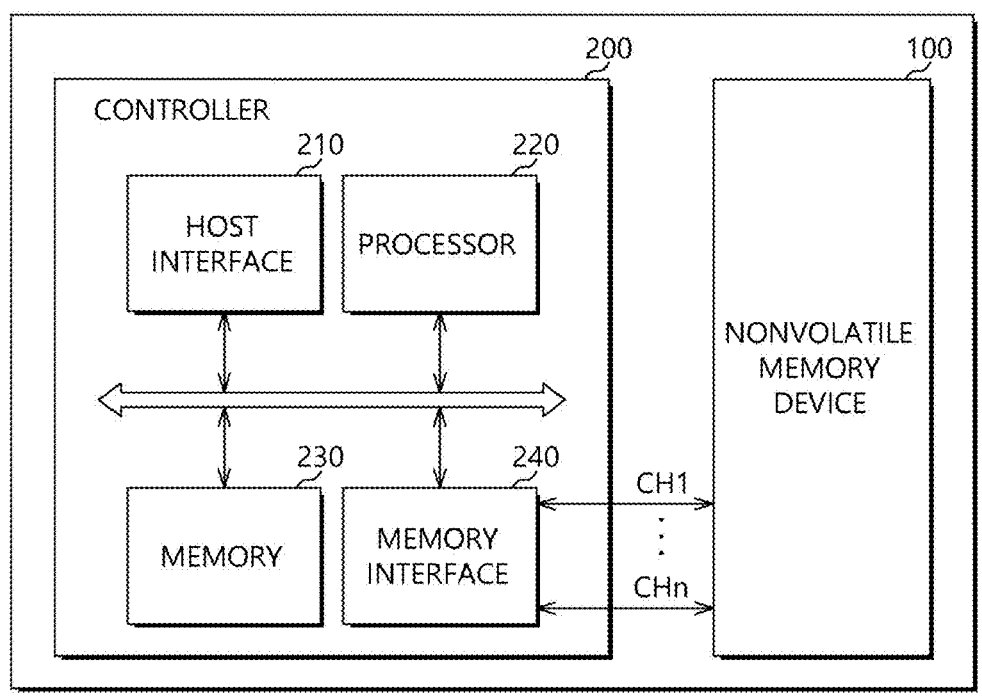
FIG. 3 is a diagram illustrating a data storage device according to an embodiment of the present disclosure.

FIG. 3 is a diagram illustrating a data storage device 10 according to an embodiment of the present disclosure. The data storage device 10 may include the nonvolatile memory device 100 and a controller 200. The data storage device 10 may be an SSD. The data storage device 10 shown in FIG. 3 may correspond to any of the plurality of data storage devices shown in FIGS. 1 and 2.

The controller 200 may switch the nonvolatile memory device 100 to a cold data storage device when the number of PE cycles of the nonvolatile memory device 100 is equal to or larger than a reference value.

For example, when the number of PE cycles of the nonvolatile memory device 100 is equal to or larger than the reference value, the controller 200 may transmit a request for switching the nonvolatile memory device 100 to the cold data storage device to a corresponding host CPU. When a reply approving the request is received from the corresponding host CPU, the controller 200 may switch the nonvolatile memory device 100 to the cold data storage device.

FIG. 4 is a diagram illustrating a method of switching a memory mode according to an embodiment. The switching method will be described with reference to the data storage device 10 shown in FIG. 3.

Referring to FIG. 4, when the data storage device 10 is in a Fresh-Out-of-Box (FOB) state, the data storage device 10 may be in an MLC mode or a TLC mode to store all hot data, warm data, and cold data, and when the number of PE cycles is equal to or larger than a reference value, the data storage device 10 may be switched to a QLC mode to store only the cold data.

In a data rearrangement performed when the number of PE cycles is equal to or larger than the reference value, the controller 200 may move first type of data among user data stored in the nonvolatile memory device 100 of the data storage device 10, which is a current data storage device, to another external data storage device, and move the second type of data among the user data, which is stored in the first memory mode region of the nonvolatile memory device 100, to the second memory mode region of the nonvolatile memory device 100.

For example, when the current data storage device is the SSD 10a1 of FIGS. 1 and 2, the other external data storage device may be any one among the SSDs 10a2 to 10an in FIG. 1 or any one among the SSDs 10a2 to 10an, 10b1 to 10bn, and 10c1 to 10cn in FIG. 2. In this example, the other external data storage device refers to one of data storage devices other than the current data storage device in which the first type of data is stored.

The data rearrangement may include any case of moving data stored in the nonvolatile memory device 100, such as garbage collection (GC), read reclaim, a data movement command from the host CPU 20, or the like.

The first type of data may be the hot data or the warm data, and the second type of data may be the cold data. The first memory mode region may be an N-bit NAND cell region, and the second memory mode region may be an (N+1)-bit NAND cell region. For example, the first memory mode region may be an MLC mode memory region or a TLC mode memory region, and the second memory mode region may be a QLC mode memory region. The controller 200 may also automatically move the cold data in a background mode.

For example, a PE cycle of a NAND cell may be changed according to the SLC mode, the MLC mode, the TLC mode, and the QLC mode. A program time of the NAND cell may be shorten in order of the QLC mode, the TLC mode, the MLC mode, and the SLC mode. When the number of PE cycles of the NAND cell is increased, the influences on read disturbance may be increased and thus data stored in the NAND cell needs to be moved to another NAND cell quickly.

When storing data in an AFA, original data O1 and O2 and copy data C1, C2, and C3 of the original data O1 and O2 may be distributed and stored in multiple data storage devices, for example, in SSD 0, SSD 1, and SSD 2, as illustrated in FIG. 6 or original data O1-1, O1-2, O1-3, and O1-4 and erasure coding data E1 may be distributed and stored in the data storage devices, for example, in the SSD 0, SSD 1, and SSD 2, as illustrated in FIG. 7. For example, the original data and the copy data (or erasure coding data) may be distributed and stored in the data storage devices, for example, in the SSDs 10a1 to 10an coupled to the same host CPU 20 illustrated in FIG. 1. In another example, the original data and the copy data (or erasure coding data) may be distributed and stored in the data storage devices, for example, in the SSDs 10a1, 10b1, and 10c1 respectively coupled to the different host CPUs 20a, 20b, and 20c illustrated in FIG. 2.

The original data O1 and O2 each may be integral original data, and the original data O1-1, O1-2, O1-3, and O1-4 each may be a portion of integral original data, for example, data obtained by dividing the integral original data according to a plurality of clusters. Therefore, all the original data O1-1, O1-2, O1-3, and O1-4 are collected to form the integral original data. The erasure coding data E1 means spare data coded for data recovery.

The erasure coding data among the above-described data is for the data recovery, and since the erasure coding data is not read unless a data error occurs, the erasure coding data has cold data characteristics. Since the copy data is also read less than the original data, the copy data also has cold data characteristics. Accordingly, the copy data and the erasure coding data are classified as the cold data in the present disclosure. Using such characteristics, information for identifying the original data, the copy data, or the erasure coding data is used as the data type identification information. For example, the original data is referred to as the hot data or the warm data, and the copy data and the erasure data are referred to as the cold data.

The controller 200 may write write data in one of the first memory mode region and the second memory mode region according to a data type of the write data. The first memory mode region may be the MLC mode memory region or the TLC mode memory region, and the second memory mode region may be the QLC mode memory region.

For example, the controller 200 may control the write data to be stored in the MLC mode memory region or the TLC mode memory region when it is determined that the write data is the hot data or the warm data, and control the write data to be stored in the QLC mode memory region when it is determined that the write data is the cold data.

The controller 200 may transmit a ratio of a cold data storage space to a total data storage space of the nonvolatile memory device 100 to the host CPU 20. For example, the controller 200 may transmit information for a ratio of a space used in the QLC mode to the total data storage space or information for a ratio of the TLC/MLC mode memory region to the QLC mode memory region to the host CPU 20. Various methods may be applied to transmit the ratio of the cold data storage space to the total data storage space of the nonvolatile memory device 100 according to the needs of a user such as an operator. For example, the controller 200 may transmit the ratio of the cold data storage space to the total data storage space of the nonvolatile memory device 100 to the host CPU 20 in real time, or may transmit the ratio to the host CPU 20 according to a request of the host CPU 20.

The nonvolatile memory device 100 may store the user data and metadata including the data type identification information matched with the user data.

Referring to FIG. 5, the nonvolatile memory device 100 may include a user area which stores the user data and a spare area which stores data such as the metadata, ECC data, and the like other than the user data.

The user data may be stored in the user area and the metadata including the data type identification information may be stored in the spare area. The data type identification information may include information identifying at least one among the original data, the copy data, and the erasure coding data.

The controller 200 may include a host interface 210, a processor 220, a memory 230, and a memory interface 240, and detailed description therefor will be provided later.

FIG. 3 is a diagram illustrating a configuration of a data storage device according to an embodiment. The data storage device and elements in the data storage device to be described later have the same elements and functions as described above and detailed description therefore will be omitted.

Referring to FIG. 3, the data storage device 10 may include the controller 200 and the nonvolatile memory device 100. The data storage device 10 may be a SSD, but this is not limited thereto.

As described above, the controller 200 may control the nonvolatile memory device 100 to be switched to the cold data storage device when the number of PE cycles is equal to or larger than the reference value.

In the data rearrangement performed when the number of PE cycles is equal to or larger than the reference value, the controller 200 may move the first type of data among the user data to another data storage device. For example, the first type of data may be moved from the data storage device 10a1 to the data storage device 10a2 in FIG. 1 or from the data storage device 10a1 to the data storage device 10b1 in FIG. 2. The controller 200 may move the second type of data among the user data stored in the first memory mode region of the nonvolatile memory device 100 to the second memory mode region of the nonvolatile memory device 100. In a data write request, the controller 200 may write the write data in one of the first and second memory mode regions according to the data type of the write data.

The first type of data may be the hot data or the warm data, and the second type of data may be the cold data. The first memory mode region may be the MLC mode memory region or the TLC mode memory region, and the second memory mode region may be the QLC mode memory region.

The controller 200 may transmit the ratio of the cold data storage space to the total data storage space of the nonvolatile memory device 100 to the host CPU 20.

The controller 200 may transmit a request for switching the nonvolatile memory device 100 to the cold data storage device to the host CPU 20 when the number of PE cycles of the nonvolatile memory device 100 is equal to or larger than the reference value, and switch the nonvolatile memory device 100 to the cold data storage device when a reply approving the request is received from the host CPU 20.

The nonvolatile memory device 100 may store the user data and the metadata including the data type identification information matched with the user data, and the nonvolatile memory device 100 may be switched to the cold data storage device under the control of the controller 200.

The data type identification information may include information for identifying at least one of the original data, the copy data, and the erasure coding data. The data type identification information, which is information transmitted from the host CPU 20 along with the write data in a write request, may be stored in the spare area (see Spare Area of FIG. 5) of the nonvolatile memory device 100, and may be referenced by the controller 200 when the controller 200 determines a data movement or a data storage position.

Referring to FIG. 3, the data storage device 10 may store data to be accessed by a host (not shown) such as a mobile phone, an MP3 player, a laptop computer, a desktop computer, a game player, a television (TV), an in-vehicle infotainment system, or the like. The data storage device 10 may refer to as a memory system.

The data storage device 10 may be configured as any of various types of storage devices according to an interface protocol coupled to a host CPU corresponding to the host. For example, the data storage device 10 may be configured as an SSD, a multimedia card in the form of MMC, eMMC, RS-MMC, or micro-MMC, a secure digital card in the form of SD, mini-SD, or micro-SD, a universal serial bus (USB) storage device, a universal flash storage (UFS) device, a personal computer memory card international association (PCMCIA) card type storage device, a peripheral component interconnection (PCI) card type storage device, a PCI Express (PCI-E) card type storage device, a compact flash (CF) card, a smart media card, a memory stick, or the like.

The data storage device 10 may be manufactured as any of various types of packages. For example, the data storage device 10 may be manufactured as a package on package (POP), a system in package (SIP), a system on chip (SOC), a multi-chip package (MCP), a chip on board (COB), a wafer-level fabricated package (WFP), or a wafer-level stack package (WSP).

The nonvolatile memory device 100 may operate as a storage medium of the data storage device 10. The nonvolatile memory device 100 may include any of various types of nonvolatile memory devices according to a type of memory cells therein, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, a resistive random access memory (ReRAM) using a transition metal compound, or the like.

Figure 14:
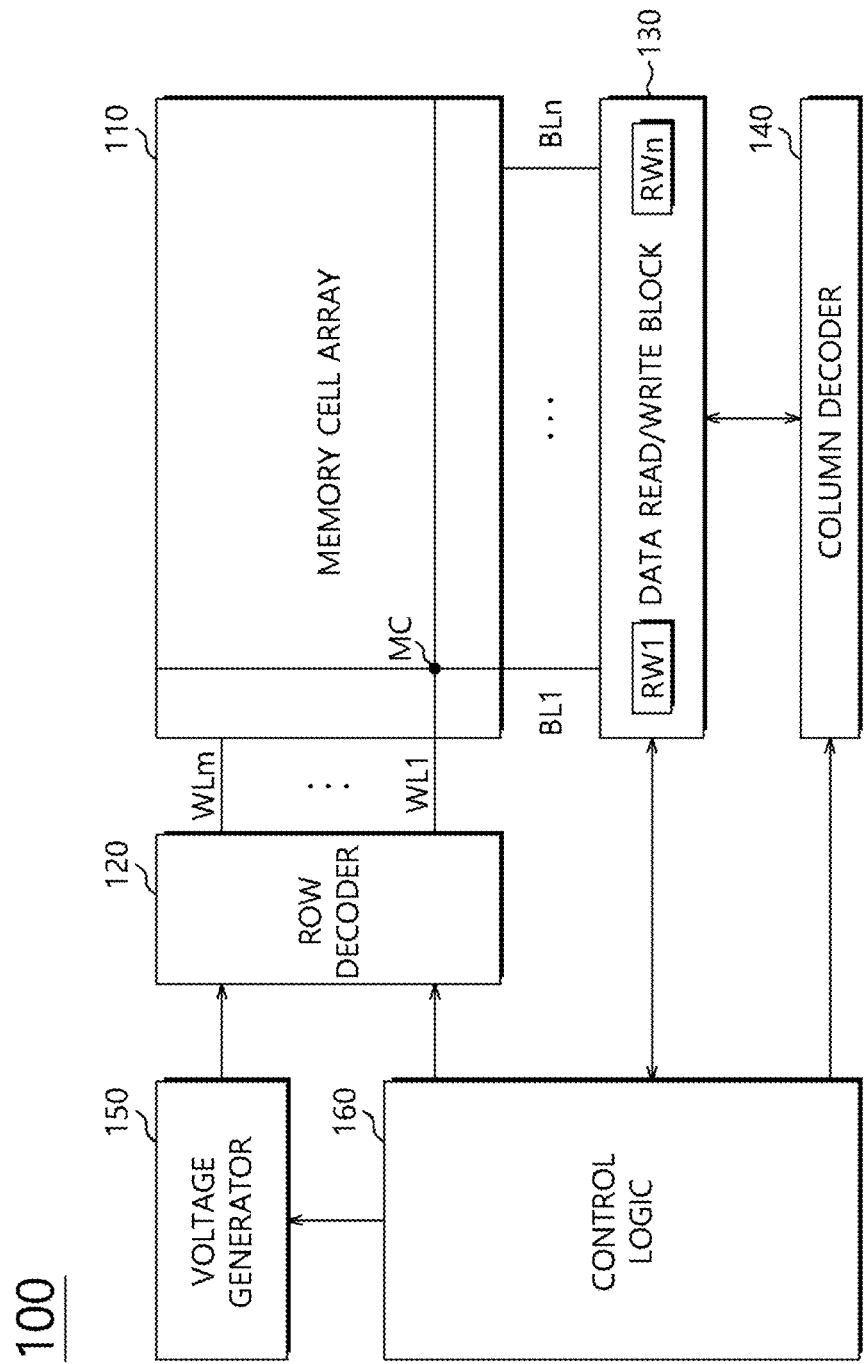
FIG. 14 is a diagram illustrating a nonvolatile memory device included in a data storage device according to an embodiment of the present disclosure.

As illustrated in FIG. 14, the nonvolatile memory device 100 may include a memory cell array 110 including a plurality of memory cells MC arranged in regions in which a plurality of word lines WL1 to WLm and a plurality of bit lines BL1 to BLn intersect. For example, each of the memory cells MC in the memory cell array 110 may be a single-level cell (SLC) in which a single bit of data (for example, 1-bit data) is to be stored, a multi-level cell (MLC) in which 2 or more bits of data is to be stored, a triple-level cell (TLC) in which 3 bits of data is to be stored, and a quad-level cell (QLC) in which 4 bits of data is to be stored. The memory cell array 100 may include at least one among the SLC, the MLC, the TLC, and the QLC. The memory cell array 110 may include memory cells arranged in a two-dimensional (2D) horizontal structure or memory cells arranged in a 3D vertical structure.

Referring back to FIG. 3, the controller 200 may control overall operations of the data storage device 10 by driving firmware or software loaded into the memory 230. The controller 200 may decode and drive a code-type instruction or algorithm such as firmware or software. The controller 200 may be implemented with hardware or a combination of hardware and software.

As described above, the controller 200 may include the host interface 210, the processor 220, the memory 230, and the memory interface 240. Although not shown in FIG. 3, the controller 200 may further include an error correction code (ECC) engine which generates parity data by ECC encoding write data provided by the host and ECC decodes read data read out from the nonvolatile memory device 100 using the parity data. The ECC engine may be provided in the inside or outside of the memory interface 240.

The host interface 210 may perform interfacing between the host and the data storage device 10 according to a protocol of the host. For example, the host interface 210 may communicate with the host using any of a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-E protocol.

The processor 220 may be configured as a micro control unit (MCU) and/or a central processing unit (CPU). The processor 220 may process requests transmitted from the host. To process the requests transmitted from the host, the processor 220 may drive a code-type instruction or algorithm (for example, firmware) loaded into the memory 230 and control internal function blocks, such as the host interface 210, the memory 230, and the memory interface 240, and the nonvolatile memory device 100.

The processor 220 may generate control signals for controlling operations of the nonvolatile memory device 100 based on the requests transmitted from the host, and provide the generated control signals to the nonvolatile memory device 100 through the memory interface 240.

The memory 230 may be configured as a random access memory such as a dynamic random access memory (DRAM) or a static random access memory (SRAM). The memory 230 may store the firmware driven by the processor 220. The memory 230 may also store data (for example, metadata) for driving the firmware. For example, the memory 230 may operate as a working memory of the processor 220. Although not shown in FIG. 3, the controller 200 may further include a processor dedicated memory arranged close to the processor 220, and thus the firmware and metadata stored in the memory 230 may be loaded into the processor dedicated memory.

The memory 230 may be configured to include a data buffer configured to temporarily store write data to be transmitted to the nonvolatile memory device 100 from the host or read data to be transmitted to the host from the nonvolatile memory device 100. For example, the memory 230 may operate as a buffer memory of the processor 220.

It has been illustrated in FIG. 3 that the memory 230 is provided in the inside of the controller 200, but the memory 230 may be provided in the outside of the controller 200.

The memory interface 240 may control the nonvolatile memory device 100 according to control of the processor 220. When the nonvolatile memory device 100 is configured of a NAND flash memory, the memory interface 240 may refer to as a flash control top (FCT) or a flash interface layer (FIL). The memory interface 240 may transmit control signals generated by the processor 220 to the nonvolatile memory device 100. The control signals may include a command, an address, an operation control signal, and the like for controlling the operations of the nonvolatile memory device 100. The operation control signal may include, for example, a chip enable signal, a command latch enable signal, an address latch enable signal, a write enable signal, a read enable signal, a data strobe signal, and the like. The memory interface 240 may transmit write data to the nonvolatile memory device 100 or receive read data from the nonvolatile memory device 100.

The memory interface 240 and the nonvolatile memory device 100 may be coupled through a plurality of channels CH1 to CHn. The memory interface 240 may transmit signals such as a command, an address, an operation control signal, and data (for example, write data) to the nonvolatile memory device 100 through the plurality of channels CH1 to CHn. The memory interface 240 may receive a status signal, data (for example, read data), and the like from the nonvolatile memory device 100 through the plurality of channels CH1 to CHn. The status signal may represent a status of the memory device 100, e.g., whether the memory device 100 is in a ready or busy state.

Figure 8:
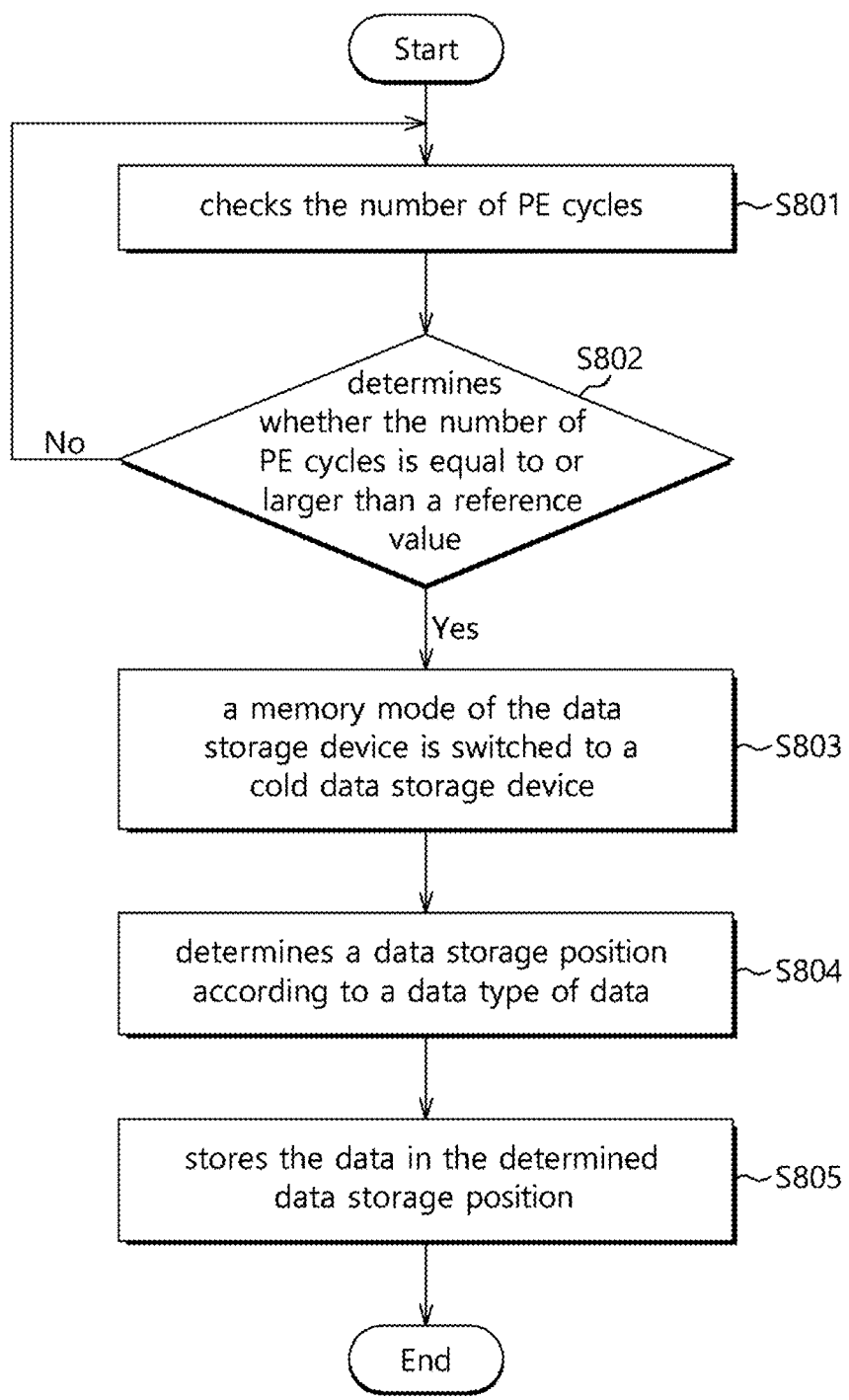
FIG. 8 is a flowchart illustrating a method of performing a data rearrangement according to an embodiment.

FIG. 8 is a flowchart illustrating a method of performing a data rearrangement according to an embodiment.

At S801, a data storage device checks the number of PE cycles and transfers information on the number of PE cycles to a host CPU.

At S802, the host CPU determines whether the number of PE cycles is equal to or larger than a reference value.

If it is determined that the number of PE cycles is equal to or larger than the reference value (YES), at S803, a memory mode of the data storage device is switched to a cold data storage device. On the other hand, if is determined that the number of PE cycles is smaller than the reference value (NO), the process returns to S801.

At S804, the data storage device determines a data storage position according to a data type of data stored in a nonvolatile memory device of the data storage device and a data type of write data provided by a host.

At S805, the data storage device stores the data stored in the nonvolatile memory device and the write data in the determined data storage position. When the data stored in the nonvolatile memory device or the write data is first type of data, i.e., hot data or warm data, the data or the write data is moved to or stored in another data storage device. When the data stored in the nonvolatile memory device or the write data is second type of data, i.e., cold data, the data or the write is moved to or stored in a second memory mode region of the nonvolatile memory device that is used to store cold data.

The memory mode of the data storage device may be switched according to a data movement command provided by the host CPU or according to a request of the data storage device and approval by the host CPU. However, embodiments are not limited thereto.

Figure 9:
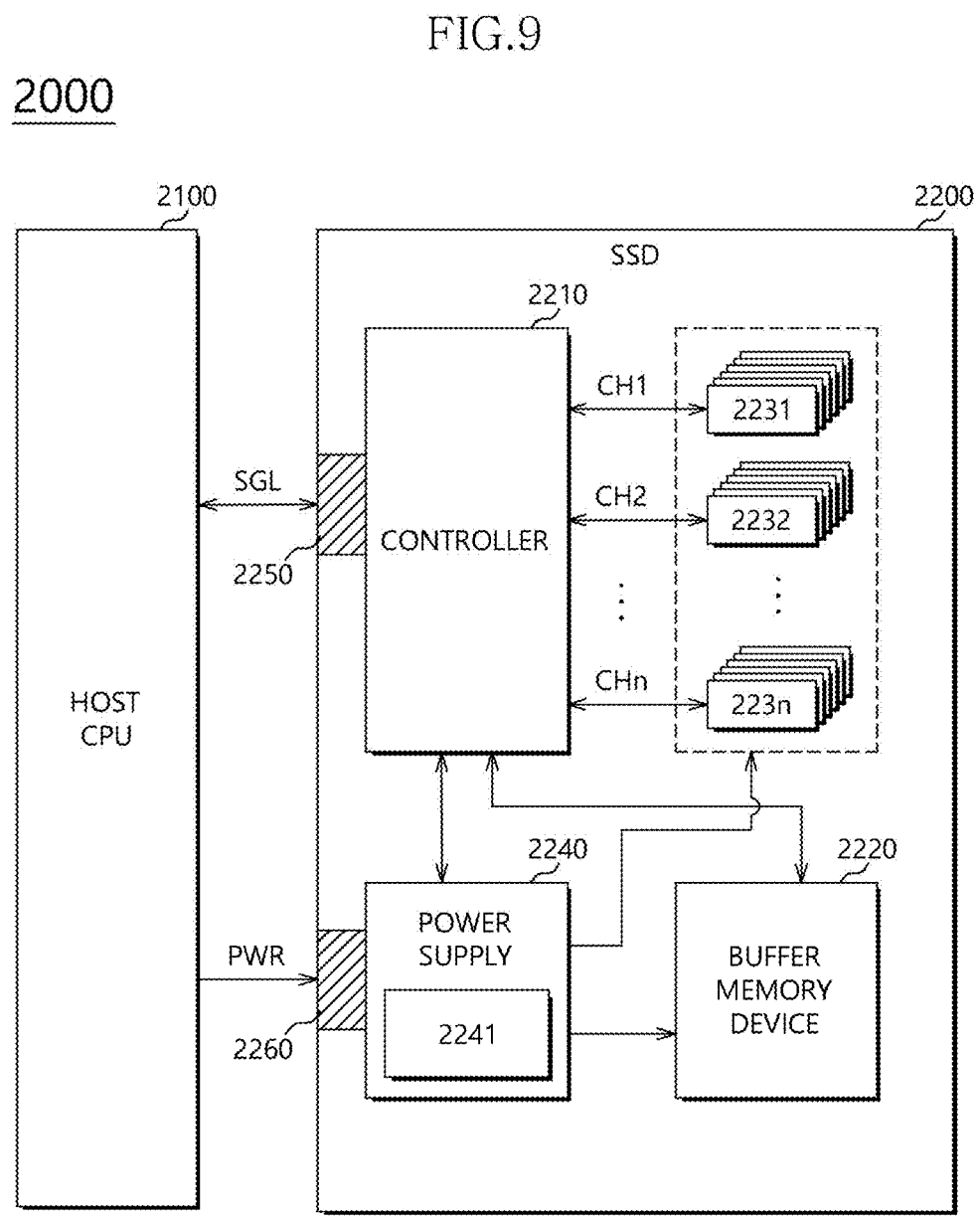
FIG. 9 is a diagram illustrating a data processing system including a solid state drive (SSD) according to an embodiment of the present disclosure.

FIG. 9 is a block diagram illustrating a data processing system 2000 including an SSD according to an embodiment. Referring to FIG. 9, the data processing system 2000 may include a host CPU 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operations of the SSD 2200.

The buffer memory device 2220 may temporarily store write data to be stored in the nonvolatile memory devices 2231 to 223n. Further, the buffer memory device 2220 may temporarily store read data read out from the nonvolatile memory devices 2231 to 223n. The data temporarily stored in the buffer memory device 2220 may be transmitted to the host CPU 2100 or the nonvolatile memory devices 2231 to 223n according to the control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to the same channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be properly shut down when sudden power-off (SPO) occurs. The auxiliary power supply 2241 may include capacitors having large capacity in order to charge the power PWR.

The controller 2210 may exchange a signal SGL with the host CPU 2100 through the signal connector 2250. The signal SGL may include a command, an address, data, and the like. The signal connector 2250 may be configured as any of various types of connectors according to an interface scheme between the host CPU 2100 and the SSD 2200.

Figure 10:
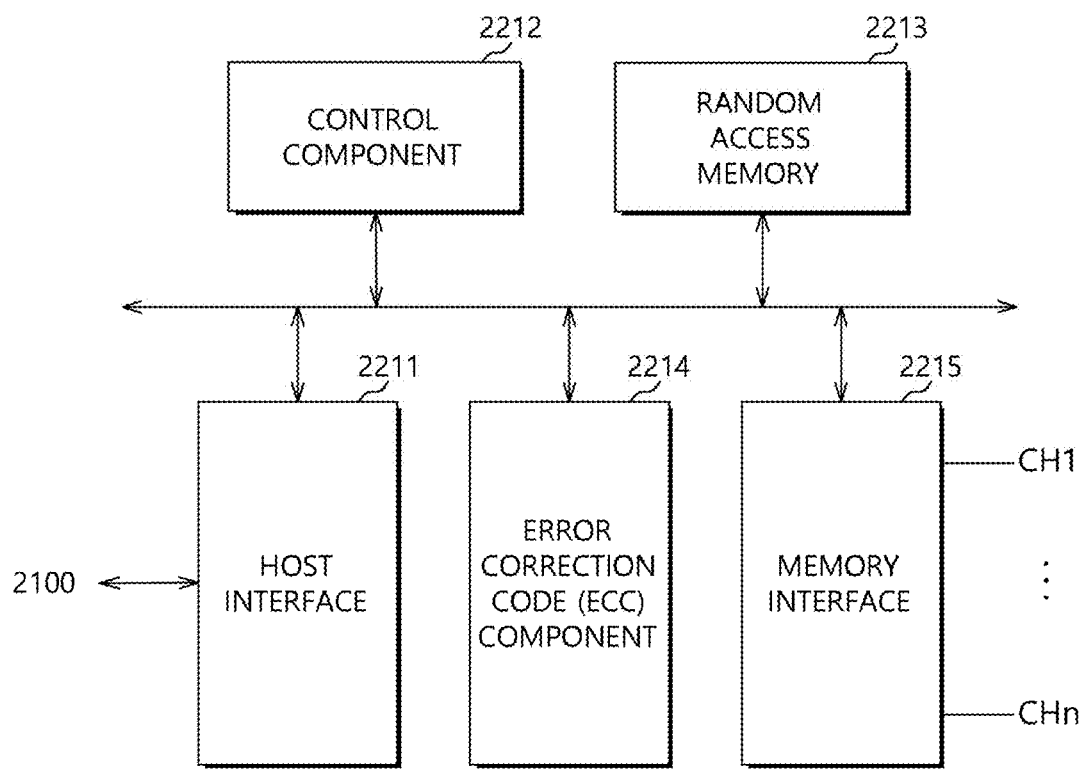
FIG. 10 is a diagram illustrating a controller shown in FIG. 9 according to an embodiment of the present disclosure.

FIG. 10 is a block diagram illustrating the controller 2210 illustrated in FIG. 9 according to an embodiment. Referring to FIG. 10, the controller 2210 may include a host interface 2211, a control component 2212, a random access memory 2213, an error correction code (ECC) component 2214, and a memory interface 2215.

The host interface 2211 may provide interfacing between the host CPU 2100 and the SSD 2200 according to a protocol of the host CPU 2100. For example, the host interface 2211 may communicate with the host CPU 2100 using any of SD, USB, MMC, embedded MMC (eMMC), PCMCIA, PATA, SATA, SCSI, SAS, PCI, PCI-E, and UFS protocols. In addition, the host interface 2211 may perform a disk emulating function for supporting the host CPU 2100 to recognize the SSD 2200 as a general-purpose data storage device, for example, a hard disk drive (HDD).

The control component 2212 may analyze and process the signal SGL inputted from the host CPU 2100. The control component 2212 may control operations of internal function blocks according to firmware or software for driving the SSD 2200. The random access memory 2213 may be used as a working memory for driving such firmware or software.

The ECC component 2214 may generate parity data of write data to be transmitted to the nonvolatile memory devices 2231 to 223n. The generated parity data may be stored, along with the write data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 11:
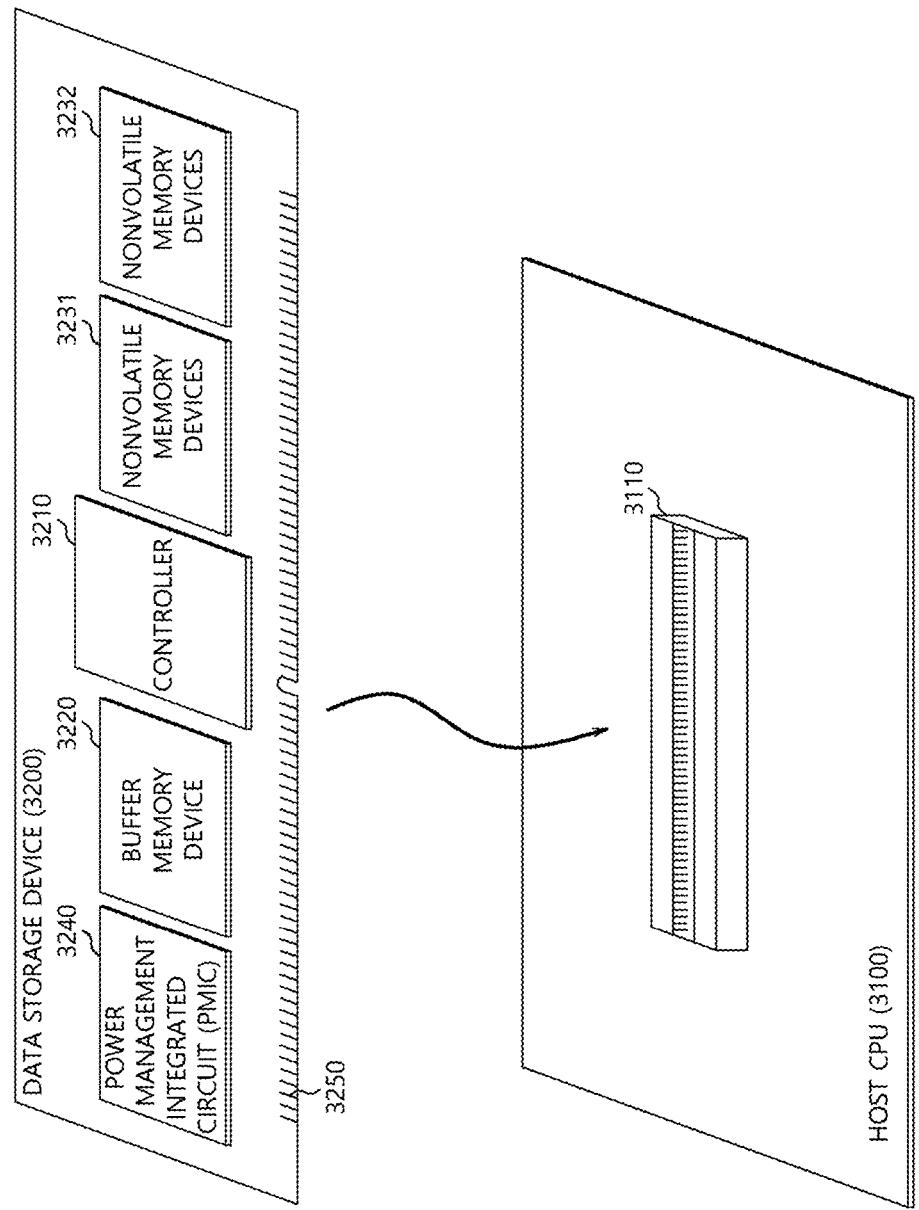
FIG. 11 is a diagram illustrating a data processing system including a data storage device according to an embodiment of the present disclosure.

FIG. 11 is a diagram illustrating a data processing system 3000 including a data storage device according to an embodiment. Referring to FIG. 11, the data processing system 3000 may include a host CPU 3100 and a data storage device 3200.

The host CPU 3100 may be configured in the form of a board such as a printed circuit board (PCB). Although not shown in FIG. 11, the host CPU 3100 may include internal function blocks for performing functions of the host CPU 3100.

Although it has been illustrated in FIG. 11 that the host CPU 3100 is coupled to a single data storage device 3200, the host CPU 3100 may be coupled to a plurality of data storage devices as in the storage system illustrated in FIGS. 1 and 2.

The host CPU 3100 may include a connection terminal 3110 such as a socket, a slot, or a connector. The data storage device 3200 may be mounted on the connection terminal 3110.

The data storage device 3200 may be configured in the form of a board such as a printed circuit board (PCB). The data storage device 3200 may refer to as a memory module or a memory card. The data storage device 3200 may include a controller 3210, a buffer memory device 3220, nonvolatile memory devices 3231 and 3232, a power management integrated circuit (PMIC) 3240, and a connection terminal 3250.

The controller 3210 may control overall operations of the data storage device 3200. The controller 3210 may be configured in the same manner as the controller 2210 shown in FIG. 10.

The buffer memory device 3220 may temporarily store write data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host CPU 3100 or the nonvolatile memory devices 3231 and 3232 according to control of the controller 3210.

The nonvolatile memory devices 3231 and 3232 may be used as storage media of the data storage device 3200.

The PMIC 3240 may provide power inputted through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host CPU 3100. Through the connection terminals 3110 and 3250, signals such as commands, addresses, data, and the like and power may be transferred between the host CPU 3100 and the data storage device 3200. The connection terminal 3250 may be configured to have any of various types depending on an interface scheme between the host CPU 3100 and the data storage device 3200. The connection terminal 3250 may be disposed on or in any side of the data storage device 3200.

Figure 12:
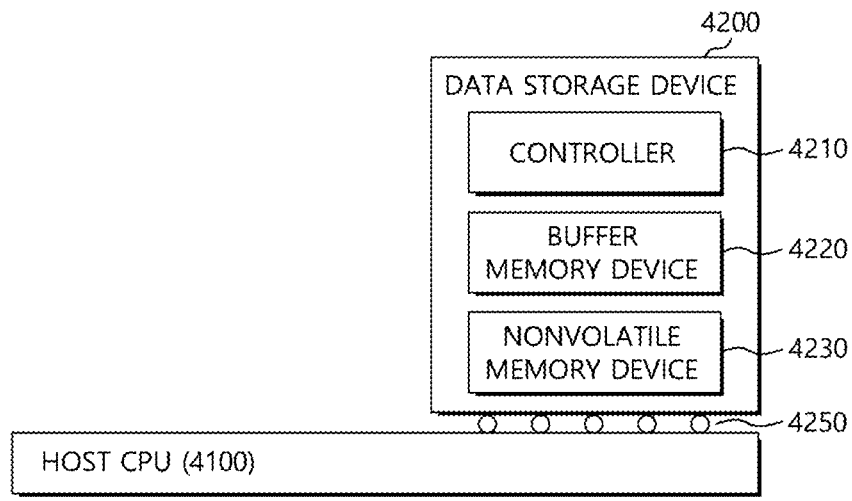
FIG. 12 is a diagram illustrating a data processing system including a data storage device according to an embodiment of the present disclosure.

FIG. 12 is a block diagram illustrating a data processing system 4000 including a data storage device according to an embodiment. Referring to FIG. 12, the data processing system 4000 may include a host CPU 4100 and a data storage device 4200. The host CPU 4100 may be configured in the form of a board such as a printed circuit board (PCB). Although not shown in FIG. 12, the host CPU 4100 may include internal function blocks for performing functions of the host CPU 4100.

The data storage device 4200 may be configured in the form of a surface-mounting type package. The data storage device 4200 may be mounted on the host CPU 4100 using solder balls 4250. The data storage device 4200 may include a controller 4210, a buffer memory device 4220, and a nonvolatile memory device 4230.

The controller 4210 may control overall operations of the data storage device 4200. The controller 4210 may be configured in the same manner as the controller 2210 shown in FIG. 10.

The buffer memory device 4220 may temporarily store write data to be stored in the nonvolatile memory device 4230. Further, the buffer memory device 4220 may temporarily store data read out from the nonvolatile memory device 4230. The data temporarily stored in the buffer memory device 4220 may be transmitted to the host CPU 4100 or the nonvolatile memory device 4230 according to control of the controller 4210.

The nonvolatile memory device 4230 may be used as a storage medium of the data storage device 4200.

Figure 13:
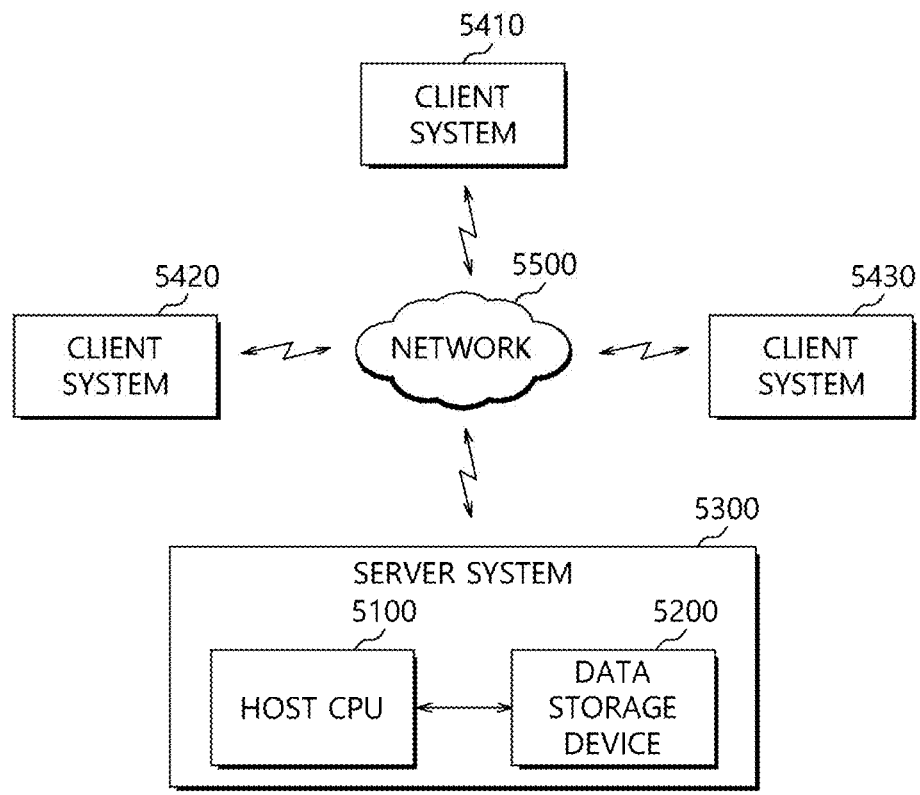
FIG. 13 is a diagram illustrating a network system including a data storage device according to an embodiment of the present disclosure.

FIG. 13 is a diagram illustrating a network system 5000 including a data storage device according to an embodiment. Referring to FIG. 13, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided by the plurality of client systems 5410 to 5430. In another example, the server system 5300 may provide data to the plurality of client systems 5410 to 5430.

The server system 5300 may include a host CPU 5100 and a data storage device 5200. The data storage device 5200 may be configured as the data storage device 10 illustrated in FIG. 3, the data storage device 2200 illustrated in FIG. 9, the data storage device 3200 illustrated in FIG. 11, or the data storage device 4200 illustrated in FIG. 12.

FIG. 14 is a block diagram illustrating a nonvolatile memory device 100 included in a data storage device according to an embodiment. Referring to FIG. 14, the nonvolatile memory device 100 may include the memory cell array 110, a row decoder 120, a data read/write block 130, a column decoder 140, a voltage generator 150, and control logic 160.

The memory cell array 110 may include the memory cells MC which are arranged in regions where the word lines WL1 to WLm and the bit lines BL1 to BLn cross each other.

The row decoder 120 may be coupled with the memory cell array 110 through the word lines WL1 to WLm. The row decoder 120 may operate according to control of the control logic 160. The row decoder 120 may decode addresses provided by an external device (not shown). The row decoder 120 may select and drive one or more of the word lines WL1 to WLm based on the decoding results. For example, the row decoder 120 may provide word line voltages generated by the voltage generator 150 to the word lines WL1 to WLm.

The data read/write block 130 may be coupled with the memory cell array 110 through the bit lines BL1 to BLn. The data read/write block 130 may include read/write circuits RW1 to RWn respectively corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided by the external device in the memory cell array 110 in a write operation. In another example, the data read/write block 130 may operate as a sense amplifier which reads out data from the memory cell array 110 in a read operation.

The column decoder 140 may operate according to control of the control logic 160. The column decoder 140 may decode addresses provided by the external device. The column decoder 140 may couple data input/output lines (or data input/output buffers) with the read/write circuits RW1 to RWn of the data read/write block 130 which respectively correspond to the bit lines BL1 to BLn based on decoding results.

The voltage generator 150 may generate voltages to be used in internal operations of the nonvolatile memory device 100. The voltages generated by the voltage generator 150 may be applied to the memory cells MC of the memory cell array 110. For example, a program voltage generated in a program operation may be applied to a word line coupled to memory cells on which the program operation is to be performed. In another example, an erase voltage generated in an erase operation may be applied to a well region of memory cells on which the erase operation is to be performed. In still another example, a read voltage generated in a read operation may be applied to a word line coupled to memory cells on which the read operation is to be performed.

The control logic 160 may control overall operations of the nonvolatile memory device 100 in response to control signals provided by the external device. For example, the control logic 160 may control operations of the nonvolatile memory device 100 such as read, write, and erase operations of the nonvolatile memory device 100.

The above described embodiments of the present invention are intended to illustrate, not limit the present invention. Various alternatives and equivalents are possible, as those skilled in the art will appreciate in light of the present disclosure. The invention is not limited by or to any of the embodiments described herein. Nor is the invention limited to any specific type of semiconductor device. Rather, the present invention encompasses all variations and modifications that fall within the scope of the appended claims.

What is claimed is:

1. A data storage device, comprising:
a nonvolatile memory device to store user data and metadata including data type identification information matched with the user data, the data type identification information indicating a type of the user data; and
a controller to change a memory mode of the data storage device in response to a command from a host central processing unit (CPU) when a number of program-erase (PE) cycles of the nonvolatile memory device is equal to or larger than a reference value, so that the data storage device is switched to a cold data storage device for storing cold data only,
wherein upon switching the data storage device to the cold data storage device, the controller moves first type of data among the user data to an external data storage device and moves second type of data among the user data, stored in a first memory mode region of the nonvolatile memory device, to a second memory mode region of the nonvolatile memory device, based on the data type identification information,
wherein, in response to a write request, the controller writes write data in one of the first and second memory mode regions according to a type of the write data, and
wherein the first type of data is hot data or warm data, and the second type of data is cold data.

2. The data storage device of claim 1, wherein the first memory mode region is a NAND cell region including a memory cell storing N-bit data, and the second memory mode region is a NAND cell region including a memory cell storing (N+1)-bit data.

3. The data storage device of claim 1, wherein the controller transmits a ratio of a cold data storage space to a total data storage space of the nonvolatile memory device to the host CPU, the cold data storage space corresponding to the second memory mode region.

4. The data storage device of claim 1, wherein the controller transmits a request for switching the data storage device to the cold data storage device to the host CPU when the number of PE cycles of the nonvolatile memory device is equal to or larger than the reference value, and switches the data storage device to the cold data storage device when a reply approving the request is received from the host CPU, the reply approving the request corresponding to the command from the host CPU.

5. The data storage device of claim 1, wherein the data storage device is a solid-state device (SSD).

6. A storage system, comprising:
a host central processing unit (CPU) to determine, according to a number of program-erase (PE) cycles for each of a plurality of data storage devices, whether to use each of the plurality of data storage devices as a cold data storage device for storing cold data only, and transmit a command to a target data storage device among the plurality of data storage devices when the number of PE cycles of the target data storage device is equal to or larger than a reference value; and
the plurality of data storage devices communicating with the host CPU, the target data storage device changing a memory mode thereof in response to the command from the host CPU so that the target data storage device is switched to the cold data storage device, determining a data storage position according to a data type of user data stored in a nonvolatile memory device included in the targets data storage device and a data type of write data upon changing the memory mode, and storing the data stored in the nonvolatile memory device and the write data in the determined data storage position,
wherein, when the memory mode is changed, the target data storage device moves first type of data among the user data to another data storage device of the plurality of data storage devices and moves second type of data among the user data, stored in a first memory mode region of the nonvolatile memory device, to a second memory mode region of the nonvolatile memory device, and
wherein the first type of data is hot data or warm data, and the second type of data is cold data.

7. The storage system of claim 6, wherein the target data storage device includes:
a controller to control the target data storage device to be switched to the cold data storage device when the number of PE cycles of the nonvolatile memory device is equal to or larger than the reference value; and
the nonvolatile memory device to store the user data and metadata including data type identification information matched with the user data, and
wherein, upon switching the target data storage device to the cold data storage device, the controller moves the first type of data among the user data to the other data storage device and moves the second type of data stored in the first memory mode region of the nonvolatile memory device to the second memory mode region of the nonvolatile memory device, and wherein, in response to the write request, the controller writes the write data in one of the first and second memory mode regions according to the data type of the write data.

8. The storage system of claim 7, wherein the host CPU receives information on the number of PE cycle from each of the plurality of data storage devices, determines whether the number of PE cycles is equal to or larger than the reference value, and transmits the command to the target data storage device.

9. The storage system of claim 7, wherein the controller transmits a request for switching the target data storage device to the cold data storage device to the host CPU when the number of PE cycles of the nonvolatile memory device is equal to or larger than the reference value, and switches the target data storage device to the cold data storage device when a reply approving the request is received from the host CPU, the reply approving the request corresponding to the command from the host CPU.

10. The storage system of claim 7, wherein, in response to a write request, the target data storage device writes the write data in one of the first and second memory mode regions according to the data type of the write data.

11. The storage system of claim 7, wherein the first memory mode region is a NAND cell region including a memory cell storing N-bit data, and the second memory mode region is a NAND cell region including a memory cell storing (N+1)-bit data.

12. The storage system of claim 7, wherein the controller transmits a ratio of a cold data storage space to a total data storage space of the nonvolatile memory device to the host CPU, the cold data storage space corresponding to the second memory mode region.

13. The storage system of claim 7, wherein the data storage device is a solid-state device (SSD).

14. The storage system of claim 7, wherein when a data movement command is received from the host CPU, the target data storage device moves the second type of data to the second memory mode region or the other data storage device based on the data type identification information.

15. The storage system of claim 7, wherein the host CPU transmits data type identification information with write data to each of the plurality of data storage devices according to a write request.

16. The storage system of claim 6, wherein each of the plurality data storage devices transmits a lifespan indicator including PE cycle information of the data storage device to the host CPU.

17. The storage system of claim 6, wherein each of the plurality of data storage devices supports PCI Express peer to peer (PCIe P2P) communication, and the plurality of data storage devices move data stored in the nonvolatile memory devices included in the plurality of data storage devices to each other in a PCIe P2P scheme.

18. A method of operating a storage system including a host CPU and a plurality of data storage devices, the method comprising:

receiving, by the host CPU, a number of PE cycles from each of the plurality of data storage devices;

determining, by the host CPU, whether the number of PE cycles is equal to or larger than a reference value;

transmitting, by the host CPU, a switching command to a target data storage device among the plurality of data storage devices, the target data storage device having the number of PE cycles that is equal to or larger than the reference value;

changing, by the target data storage device, a memory mode of the target data storage device in response to the switching command so that the target data storage device is switched to a cold data storage device for storing cold data only;

determining, by the target data storage device, a data storage position according to a data type of user data stored in a nonvolatile memory device of the target data storage device and a data type of write data provided by the host CPU; and storing, by the target data storage device, the user data stored in the nonvolatile memory device and the write data in the determined data storage position, wherein, when the memory mode is changed, the target data storage device moves first type of data among the user data to another data storage device of the plurality of data storage devices and moves second type of data among the user data, stored in a first memory mode region of the nonvolatile memory device, to a second memory mode region of the nonvolatile memory device, and wherein the first type of data is hot data or warm data, and the second type of data is cold data.

* * * * *